United States Patent
Franco et al.

(10) Patent No.: US 6,996,519 B2
(45) Date of Patent: Feb. 7, 2006

(54) METHOD AND APPARATUS FOR PERFORMING RELATIONAL SPEECH RECOGNITION

(75) Inventors: Horacio E. Franco, Menlo Park, CA (US); David J. Israel, Palo Alto, CA (US); Gregory K. Myers, San Francisco, CA (US)

(73) Assignee: SRI International, Menlo Park, CA (US)

( * ) Notice: Subject to any disclaimer, the term of this patent is extended or adjusted under 35 U.S.C. 154(b) by 532 days.

(21) Appl. No.: 09/967,228

(22) Filed: Sep. 28, 2001

(65) Prior Publication Data

US 2003/0065511 A1     Apr. 3, 2003

(51) Int. Cl.
*G10L 15/18*   (2006.01)

(52) U.S. Cl. ............................. 704/9; 704/10; 704/255; 704/257

(58) Field of Classification Search ................ 704/251, 704/255, 256, 258, 240, 236, 231, 270
See application file for complete search history.

(56) References Cited

U.S. PATENT DOCUMENTS

| | | | | |
|---|---|---|---|---|
| 5,177,685 A | * | 1/1993 | Davis et al. | 455/456.5 |
| 5,825,978 A | * | 10/1998 | Digalakis et al. | 704/256 |
| 5,839,106 A | * | 11/1998 | Bellegarda | 704/257 |
| 6,029,132 A | * | 2/2000 | Kuhn et al. | 704/260 |
| 6,314,165 B1 | * | 11/2001 | Junqua et al. | 379/88.03 |
| 6,526,380 B1 | * | 2/2003 | Thelen et al. | 704/251 |
| 6,631,346 B1 | * | 10/2003 | Karaorman et al. | 704/9 |
| 6,823,493 B2 | * | 11/2004 | Baker | 715/530 |

OTHER PUBLICATIONS

Hunt, M., "Automatic Identification of Spoken Names and Addresses—and why we should abolish account numbers," Novauris, A James Baker Company Presentation, www.novauris.com, Date Unknown, (Assignee became aware of this reference on Feb. 4, 2005).

* cited by examiner

*Primary Examiner*—Susan McFadden
(74) *Attorney, Agent, or Firm*—Kin-Wah Tong; Patterson & Sheridan LLP

(57) ABSTRACT

A method and apparatus for performing speech recognition using observable relationships between words. Results from a speech recognition pass can be combined with information about the observable word relationships to constrain or simplify subsequent recognition passes. This iterative process greatly reduces the search space required for each recognition pass, making the speech recognition process more efficient, faster and accurate.

17 Claims, 3 Drawing Sheets

METHOD AND APPARATUS FOR PERFORMING RELATIONAL SPEECH RECOGNITION

BACKGROUND OF THE INVENTION

1. Field of the Invention

The invention relates generally to speech recognition and, more specifically, to speech recognition systems used to recognize groups of words that have observable relationships.

2. Description of the Related Art

Global Positioning System (GPS)-based navigation systems have recently become available in some automobiles. To use these systems, a driver must enter an address or location, typically with a touch screen. The navigation system then provides instructions (usually with a map, arrow displays, or a synthesized voice) that directs the driver from the present location to the desired location.

Although current navigation systems work quite well at providing directions, a driver cannot enter new locations via the touch screen while the car is moving. And even when the car is stopped, using a touch screen to enter an address can be slow and difficult.

Replacing or supplementing the touch screen with a speech recognition system would make navigation systems much easier to use, and would make it possible for a driver to enter an address while the car is moving. However, it is well known that recognition of spoken addresses is an extremely difficult task because of the huge number of street and city names that such a speech recognition system would need to recognize. See, for example, the discussion in U.S. Pat. No. 5,177,685 to Davis et al., at column 24, lines 45–56.

One way to reduce the "search space" of a speech recognizer is to use a "prompt and response" type interface. These systems typically prompt the speaker to say only one word or short phrase at a time. For example, the speaker may be prompted to say only a street number or only a city name. This allows the system to perform a series of much simpler speech recognition passes, rather than performing the very difficult task of recognizing an entire spoken address or other long phrase.

Although prompt and response systems simplify the speech recognition task, they can be both slow and annoying to use because they require the speaker to answer a series of questions. Accordingly, there remains a need for speech recognition system that allows the speaker to say an address or other difficult to recognize phrase in a single utterance and have that utterance understood and acted upon.

SUMMARY OF THE INVENTION

The disadvantages associated with the prior art are overcome by a method and apparatus for performing speech recognition using the observable relationships between words. Results from a speech recognition pass can be combined with information about the observable word relationships to constrain or simplify subsequent recognition passes. This iterative process greatly reduces the search space required for each recognition pass, making the overall speech recognition process more efficient, faster and accurate.

DETAILED DESCRIPTION OF THE PREFERRED EMBODIMENT

Figure 1:
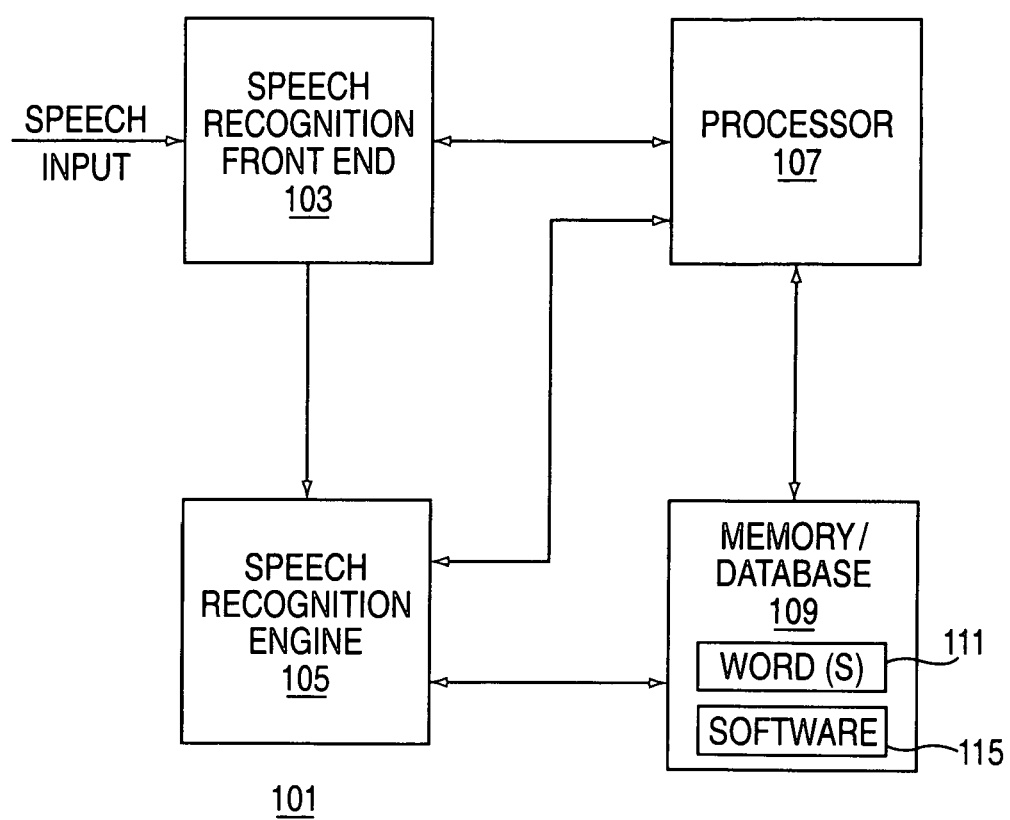
FIG. 1 is a block diagram of a speech recognition system that operates in accordance with the present invention.

FIG. 1 is a block diagram illustrating a speech recognition system 101 that operates in accordance with the present invention. This system 101 may be implemented in a portable device such as a hand held computer, a portable phone, or an automobile. It may also be implemented in a stationary device such as a desktop personal computer or an appliance, or it may be distributed between both local and remote devices. The speech recognition system 101 illustratively comprises a speech recognition front end 103, a speech recognition engine 105, a processor 107, and a memory/database 109.

The speech recognition front end 103 receives and samples spoken input, and then measures and extracts features or characteristics of the spoken input that are used later in the speech recognition process. The speech recognition engine 105 may include a search algorithm (such as a Viterbi search algorithm) and acoustic models (such as models of individual phonemes or models of groups of phonemes) used in the speech recognition process. The processor 107 and associated memory 109 together operate as a computer to control the operation of the front end 103 and the speech recognition engine 105. The memory 109 stores recognizable words and word sets 111 in an accessible database that is used by the system 101 to process speech. Memory 109 also stores the software 115 that is used to implement the methods of the present invention. Both the speech recognition front end 103 and the speech recognition engine 105 may be implemented in hardware, software, or combination of hardware and software. All of the elements 103–109 may communicate with each other as required.

The invention relates to speech recognition systems and methods used to recognize words that have observable relationships. Examples of word sets with observable relationships are addresses; locations; names and telephone numbers; airline flight numbers, departure/arrival times, and departure/arrival cities; product part numbers, catalog numbers, and product names; and any other sets of words used to identify a person, place or thing.

Groups of words with observable relationships may be referred to as "sparse domains" or domains that have a small "Cartesian product" because typically only a small fraction of all possible word combinations are valid combinations. For example, an address with the ZIP code "94025" is only associated with the city of Menlo Park, Calif. "San Francisco, Calif. 94025" or "Menlo Park, N.J. 94025" are not valid addresses.

Figure 2:
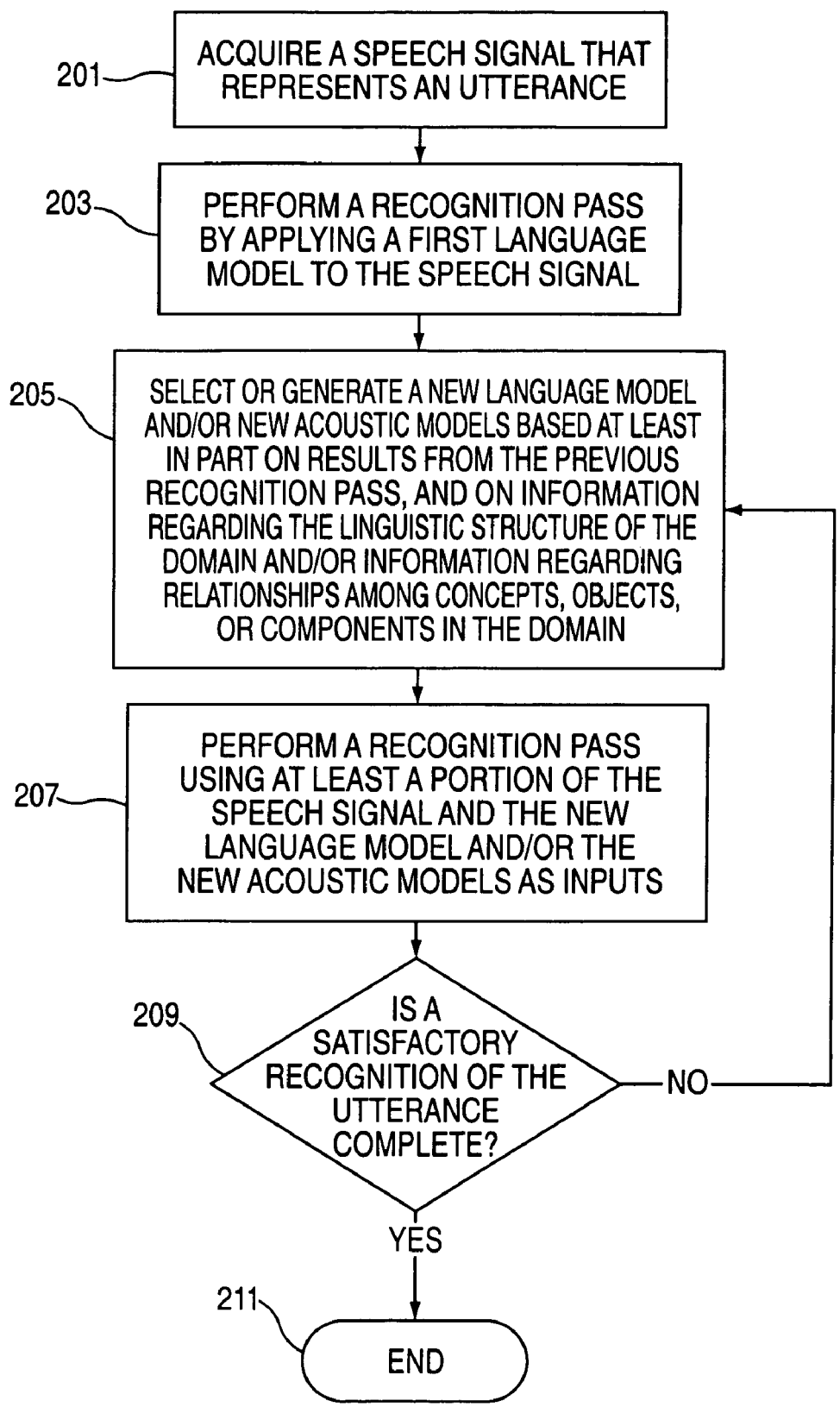
FIG. 2 is a flow chart illustrating a method for recognizing words that have observable relationships.

FIG. 2 is a flow chart illustrating a preferred method for recognizing words that have observable relationships. This method may be implemented as a software routine 115 that is executed by the processor 107 of FIG. 1. When a speech signal that represents a spoken utterance is received (step 201), a speech recognition "pass" is performed by applying a first language model to the speech signal (step 203). The language model may be a probabilistic finite state grammar, a statistical language model, or any other language model that is useful in a speech recognition system. The first recognition pass does not attempt to recognize the entire speech signal; for example, if the utterance represents an address, the first recognition pass may use a language model that recognizes only city names or only street numbers.

Next, a new language model and/or new acoustic models are selected or generated (step 205). The selection or generation of the new model or models is based at least in part on results from the previous recognition pass, and may also be based on information regarding the linguistic structure of the domain and/or information regarding relationships among concepts, objects, or components in the domain. For example, the previous recognition passes may have recognized the city name "Menlo Park" and the street number "333." Based on this information, a new language model might be generated or selected that includes only those streets in Menlo Park that have "333" as a street number.

This new language model and/or acoustic models and at least a portion of the speech signal are then used to perform another recognition pass (step 207). If a satisfactory recognition of the spoken utterance is complete (step 209), the speech recognition process ends (step 211). If a satisfactory recognition of the spoken utterance is not complete, then steps 205–209 are repeated as necessary.

Figure 3:
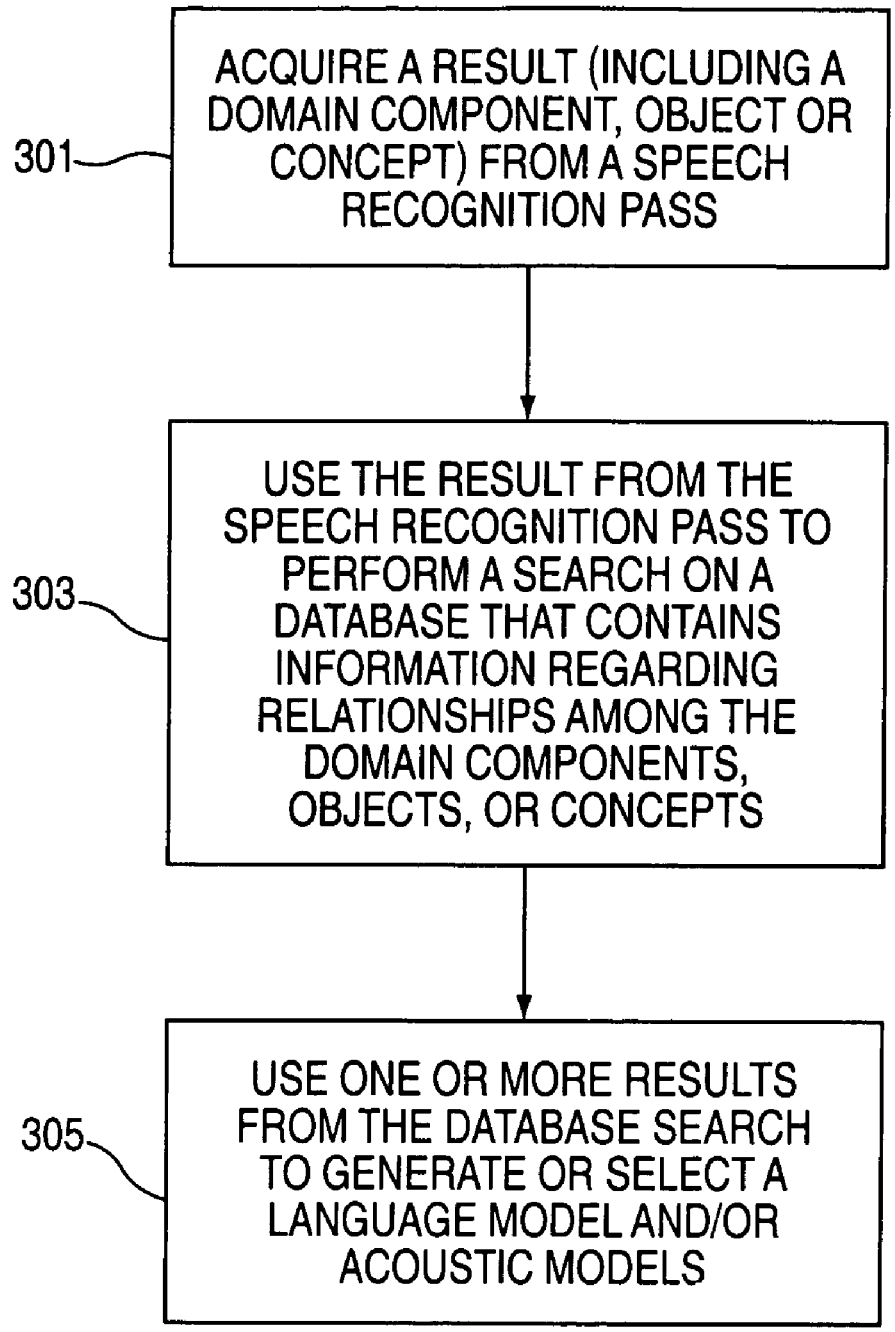
FIG. 3 is a flow chart illustrating a method for generating or selecting new language models and/or new acoustic models for use in a speech recognition process.

FIG. 3 is a flowchart that illustrates a preferred method for generating or selecting a new language model and/or new acoustic models (i.e., a method performing step 205 of FIG. 2.). In this method, a result from a speech recognition pass is acquired (step 301). This result includes a component, object or concept of the relevant domain. For example, if the speech recognition system is being used to recognize an address, the result from the previous recognition pass may include a street number or city name.

Next, the result from the speech recognition pass is used to perform a search on a database that contains information regarding relationships among the domain concepts, objects, or components (step 303). For example, the database may be a relational database that has information regarding the relationships among the components of an address. A search on the city name "Menlo Park" might find all the street names in that city; a search on the ZIP code "94025" might find all the streets within that ZIP code; and so on.

Finally, one or more results from the database search are then used to select or generate a language model and/or acoustic models (step 305). For example, the results from a database search on the ZIP code "94025" might be used to generate a language model (or select an existing language model) that includes all of the street names in that ZIP code. Or, the results from a database search on the city name "Menlo Park" and the street name "Ravenswood Avenue" might be used to generate or select a language model that includes all of the street numbers on Ravenswood Avenue in Menlo Park. Language models generated or selected this way can be used to greatly reduce the search space of subsequent recognition passes, making the speech recognition process both faster and more accurate.

While foregoing is directed to the preferred embodiment of the present invention, other and further embodiments of the invention may be devised without departing from the basic scope thereof, and the scope thereof is determined by the claims that follow.

What is claimed is:

1. A method for recognizing an utterance that pertains to a sparse domain, the sparse domain having a linguistic structure and a plurality of components, objects or concepts, the method comprising the steps of:
 acquiring a speech signal that represents an utterance;
 performing a first recognition pass by applying a first language model to the speech signal;
 selecting or generating a second language model based at least in part on results from the first recognition pass, on information regarding a linguistic structure of a domain within the speech signal, and on information regarding relationships among the domain components, objects or concepts within the speech signal; and
 performing a second recognition pass by applying the second language model to at least a portion of the speech signal to recognize the utterance containing the speech signal.

2. The method of claim 1 wherein the first and second language models are probabilistic finite state grammars.

3. The method of claim 1 wherein the first and second language models are statistical language models.

4. The method of claim 1 further comprising the step of selecting or generating acoustic models based at least in part on results from the first recognition pass, on information regarding the linguistic structure of the domain, and on information regarding relationships among the domain components, objects or concepts.

5. A method for recognizing an utterance pertaining to an address or location, each address or location having a plurality of components, the method comprising the steps of:
 acquiring a speech signal that represents an utterance;
 performing a first recognition pass by applying a first language model to the speech signal;
 selecting or generating a second language model based at least in part on results from the first recognition pass and on information regarding relationships among the address or location components; and
 performing a second recognition pass by applying the second language model to at least a portion of the speech signal to recognize the utterance contained in the speech signal.

6. The method of claim 5 further comprising the step of selecting or generating acoustic models, the selection or generation based at least in part on results from the first recognition pass and on information regarding relationships among the address or location components.

7. In a speech recognition system, a method for recognizing an utterance comprising the steps of:
 acquiring a speech signal that represents the utterance; and
 performing a series of recognition passes, a second and subsequent recognition passes processing at least a portion of the speech signal using a language model that is constrained by a result of a previous recognition pass.

8. The method of claim 7 wherein the second and subsequent recognition passes use acoustic models that are constrained by a result of a previous recognition pass.

9. A method for generating language models between speech recognition passes, the language models based on a domain having a linguistic structure and a plurality of components, objects or concepts, the method comprising the steps of:
 generating or acquiring a database containing information regarding the linguistic structure of the domain and information regarding relationships among the domain components, objects or concepts;
 acquiring a result from a speech recognition pass, the result including a domain component, object or concept; and
 generating a language model that includes a subset of the domain by using the result from the speech recognition pass to select information from the database.

10. In a speech recognition system, a method for generating language models based on a domain having a plurality of components, objects or concepts, the method comprising the steps of:
- acquiring a result from a speech recognition pass, the result including a domain component, object or concept;
- using the result from the speech recognition pass to perform a search on a database that contains information regarding relationships among the domain components, objects or concepts; and
- generating a language model using a result from the database search.

11. A method for recognizing an address or location expressed as a single utterance, the method comprising the steps of:
- acquiring a speech signal that represents the single utterance; and
- performing a series of recognition passes, a second and subsequent recognition passes processing at least a portion of the speech signal using a language model that is constrained by a result of a previous recognition pass.

12. The method of claim 11 wherein each address or location has a plurality of components.

13. The method of claim 12 wherein the first recognition pass processes the speech signal using a first language model.

14. The method of claim 13 wherein the first language model may be used to recognize only a subset of the address or location components.

15. The method of claim 14 wherein the language models used in the second and subsequent recognition passes may be used to recognize only a subset of the address or location components.

16. The method of claim 15 wherein the second and subsequent language models are selected or generated by using the result from a previous recognition pass to perform a search on a database that contains information regarding relationships among the address or location components.

17. The method of claim 11 wherein the second and subsequent recognition passes uses acoustic models that are constrained by a result of a previous recognition pass.

* * * * *